(12) United States Patent
Kaneda et al.

(10) Patent No.: US 7,296,850 B2
(45) Date of Patent: Nov. 20, 2007

(54) VEHICLE ROOF STRUCTURE WITH DAMPENING BRACKET

(75) Inventors: Tomoyuki Kaneda, Isehara (JP); Seiji Higashi, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 233 days.

(21) Appl. No.: 11/168,351

(22) Filed: Jun. 29, 2005

(65) Prior Publication Data

US 2006/0006683 A1  Jan. 12, 2006

(30) Foreign Application Priority Data

Jul. 9, 2004   (JP)  .............. 2004-202969

(51) Int. Cl.
*B60J 9/00*   (2006.01)
(52) U.S. Cl. ...................... 296/210; 296/39.3
(58) Field of Classification Search ................ 296/104, 296/39.3, 210, 37.8, 214, 211
See application file for complete search history.

(56) References Cited

U.S. PATENT DOCUMENTS 5,681,076 A * 10/1997 Yoshii ........................ 296/210
6,863,326 B1 * 3/2005 Tiesler et al. .............. 296/1.07

FOREIGN PATENT DOCUMENTS

| EP | 0538608 A1 | 4/1993 |
|----|------------|--------|
| JP | 59-29366 U | 2/1984 |
| JP | 07-089389 A | 4/1995 |
| JP | 11-105736 A | 4/1999 |
| JP | 11-180339 A | 7/1999 |

* cited by examiner

*Primary Examiner*—Joseph D Pape
(74) *Attorney, Agent, or Firm*—Global IP Counselors, LLP

(57) ABSTRACT

A vehicle roof structure is provided with a roof panel dampening bracket which adds mass to a roof panel in order to control the resonance frequency of the roof panel. The dampening bracket has a base part, a mass adding part and a connecting part. The base part is joined to a roof bow. The mass adding part is joined to the undersurface of the roof panel by an adhesive agent in at least two points in both end parts of the vehicle in the front to aft direction. The connecting part extends in the front to aft direction of the vehicle to interconnect the base part and the mass adding part. The connecting part has at least one bent part that extends in the lateral direction of the vehicle.

20 Claims, 6 Drawing Sheets

VEHICLE ROOF STRUCTURE WITH DAMPENING BRACKET

CROSS-REFERENCE TO RELATED APPLICATIONS

This application claims priority to Japanese Patent Application No. 2004-202969. The entire disclosure of Japanese Patent Application No. 2004-202969 is hereby incorporated herein by reference.

BACKGROUND OF THE INVENTION

1. Field of the Invention

The present invention generally relates to a dampening bracket for a vehicle roof panel. More specifically, the present invention relates to a vehicle roof structure with a dampening bracket that can prevent unpleasant noise from being generated in the passenger compartment from the sound caused by vibration of the roof panel of the passenger compartment.

2. Background Information

Passenger vehicles sometimes encounter a situation in which roof panel vibrates. In particular, the roof panel sometimes vibrates as a result of vibrations from vibration sources such as the engine and the like. If the resonance frequency of the roof panel from this vibration is that same as the cavity resonance frequency of the vehicle body, or is greater than this cavity resonance frequency, then the roof panel emits noise such that an unpleasant noise is generated inside the passenger compartment.

One example of a technique that has been proposed as a countermeasure for preventing the generation of an unpleasant noise in the passenger compartment as a result of the vibration of the roof panel is described in Japanese Unexamined Patent Application No. 59-29366. In this publication, a dampening steel plate is joined by bonding to the undersurface of the roof panel, which adds mass to the roof panel so that the resonance frequency of the roof panel is shifted from the cavity resonance frequency of the vehicle body. In such a construction, however, since a dampening steel plate is directly joined by bonding to the undersurface of the roof panel, which has a large vibration amplitude, there is a danger that this dampening steel plate will separate from the roof panel by this vibration, and may, in the worst case, fall from the roof panel.

In view of the above, it will be apparent to those skilled in the art from this disclosure that there exists a need for an improved vehicle roof panel dampening bracket. This invention addresses this need in the art as well as other needs, which will become apparent to those skilled in the art from this disclosure.

SUMMARY OF THE INVENTION

The present invention was developed to solve the aforementioned problems that may be encountered in the roof panel structure described in the aforementioned publication. Accordingly, one object of the present invention to provide a vehicle roof panel dampening bracket which is devised so that when mass is added to the roof panel in order to control the resonance frequency of the roof panel, this mass is prevented from falling due to the vibration of the roof panel.

In order to achieve the above object and other objects of the present invention, a vehicle roof panel dampening bracket is provided that basically comprises a base part, a connecting part and a mass adding part. The base part is configured and arranged as a vehicle roof bow attachment point. The connecting part is coupled to the base part and disposed in a front to aft vehicle direction relative to the base part with the connecting part including at least one bent part that extend in a lateral vehicle direction in an area below the vehicle roof bow attachment point of the base part. The mass adding part is coupled to the connecting part and disposed in the front to aft vehicle direction relative to the connecting part with the mass adding part being configured and dimensioned with a prescribed mass to function as a mass dampener that controls a resonance frequency of the roof panel by adding mass to the roof panel. The mass adding part has a forward roof panel attachment point and a rearward roof panel attachment point that are spaced apart in the front to aft vehicle direction with the forward and rearward roof panel attachment points being configured and arranged to be bonded to a roof panel undersurface by an adhesive agent.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
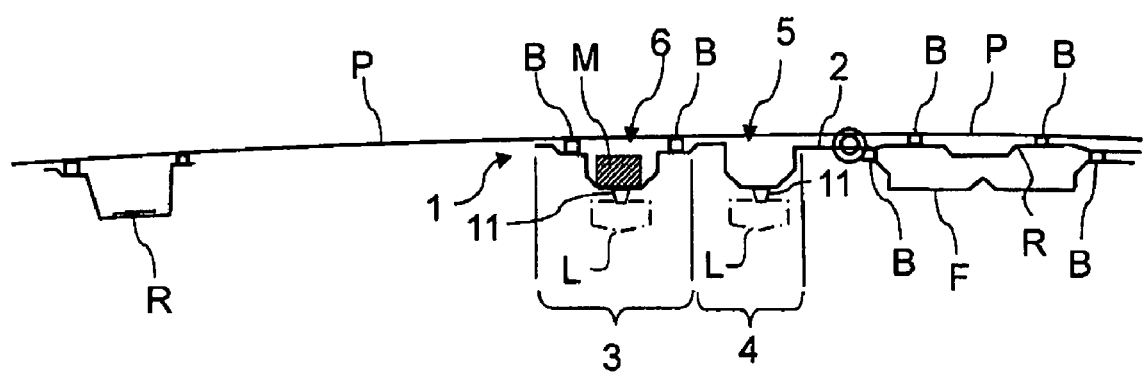
FIG. 1 is a simplified transverse cross sectional view of a portion of a vehicle roof that shows connection between the vehicle roof panel, the roof bow and a vehicle roof dampening bracket in accordance with one embodiment of the present invention as viewed from a lateral direction of the vehicle.
Figure 2:
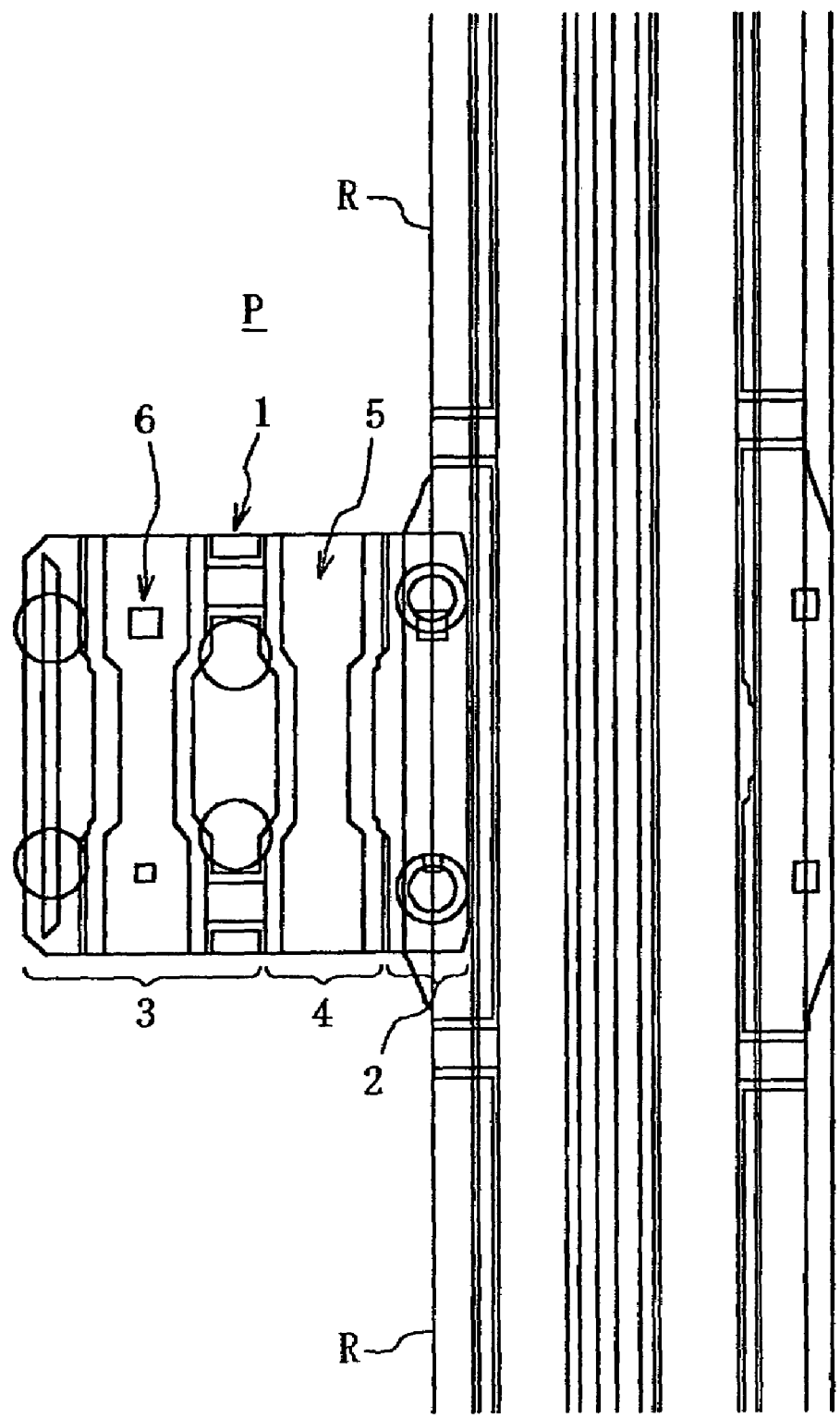
FIG. 2 is a simplified top plan view of the connection between the vehicle roof panel, the roof bow and the vehicle roof dampening bracket in accordance with the present invention.

Referring initially to FIG. 1, a simplified transverse cross sectional view of a portion of a vehicle roof is illustrated in accordance with one embodiment of the present invention. FIG. 1 shows the joined configuration of a dampening bracket 1 for a roof panel P constituting an embodiment of the present invention. The roof panel P is a sheet metal member that has a plurality of roof bows or cross members R (only two shown) that extend in the lateral direction of the vehicle. As explained below, the dampening bracket 1 of the present invention is effective when applied to the roof structure of the passenger compartment in reducing noise inside the passenger compartment. FIG. 2 is a simplified top plan view showing the joined configuration of the dampening bracket 1 for the roof panel 1 with double circles indicate locations joined by spot welding, and single circles indicate locations joined by an adhesive agent B.

Figure 3:
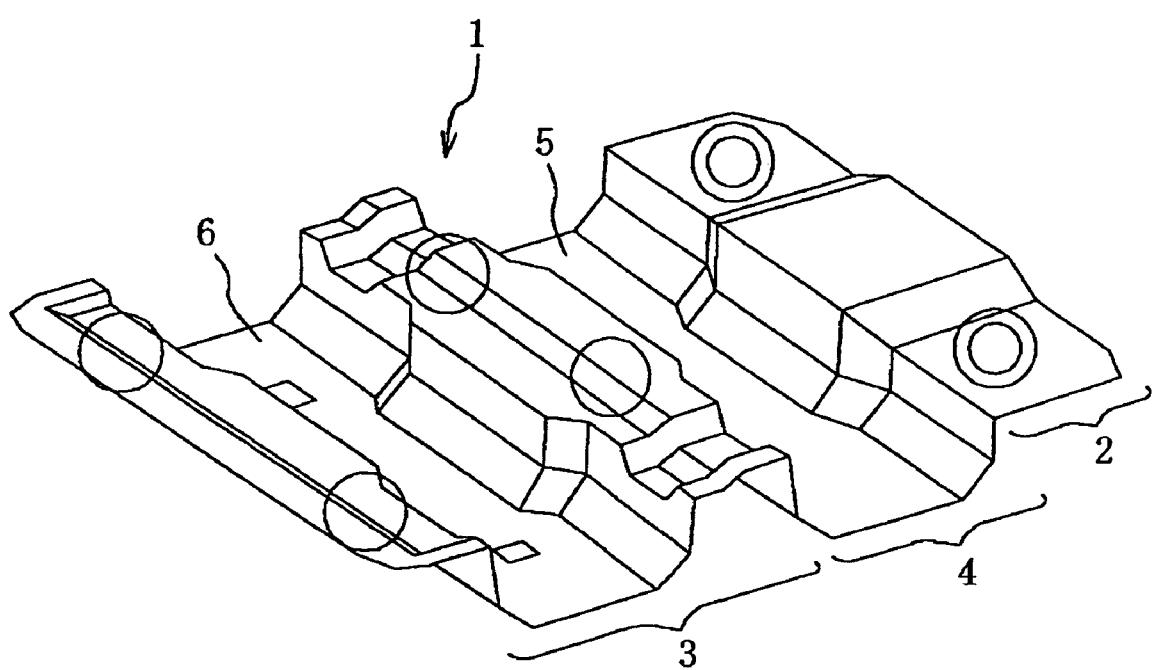
FIG. 3 is a simplified top perspective view of the vehicle roof dampening bracket in accordance with the present invention.

As shown in FIGS. 1-3, the vehicle roof dampening bracket 1 of the present invention is a bracket which is configured and arranged to function as a mass dampener that controls the resonance frequency of the roof panel P by adding mass to the roof panel P. The bracket 1 basically includes a base part 2, a mass adding part 3 and a connecting part 4. The bracket 1 is preferably a one-piece, unitary member that is constructed of a rigid sheet material such as a sheet metal material.

The base part 2 is configured and arranged to be joined to the roof bow or cross member R by spot welding in the two positions indicated by double circles to an upper surface of the front end part (with respect to the vehicle) of the roof bow R. In other words, the base part 2 is configured and arranged as a vehicle roof bow attachment point of the vehicle roof dampening bracket 1. The roof bow R is in turn joined to the roof panel P by an adhesive agent B at a plurality of points.

The mass adding part 3 is coupled to the connecting part 4 and disposed in the front to aft vehicle direction relative to the connecting part 4 with the mass adding part being configured and dimensioned with a prescribed mass to function as a mass dampener that controls a resonance frequency of the roof panel P by adding mass to the roof panel P. The mass adding part 3 is joined to a central portion of the undersurface of the roof panel P (substantially centered between the adjacent roof bows R) by an adhesive agent B. Preferably, the mass adding part 3 has at least a pair of forward roof panel attachment points and at least a pair of rearward roof panel attachment points that are spaced apart in the front to aft vehicle direction with the forward and rearward roof panel attachment points being configured and arranged to be bonded to the undersurface of the roof panel P by an adhesive agent B. The forward and rearward roof panel attachment points are indicated by single circles in FIGS. 2 and 3. Accordingly, the mass adding part 3 is joined to the roof panel P at both end parts, with respect to the front to aft direction of the vehicle, by a pair of adhesive bonds. In other words, the mass adding part 3 and the roof panel P and bonded together at a total of at least four adhesive bonding points in the illustrated example, as will be described later.

Thus, since the mass adding part 3 is joined to the undersurface of the roof panel P by the adhesive agent B at both end parts in at least two points in the front to aft direction of the vehicle, the mass of the mass adding part 3 is added to the roof panel P, so that the resonance frequency of the roof panel P is shifted from a first cavity resonance frequency to a second cavity resonance frequency that is reduced to a frequency that is lower than the first cavity resonance frequency, thus making it possible to suppress the emission of noise by the roof panel P.

Furthermore, the mass adding part 3 is preferably configured and arranged relative to the roof panel P to form a carrying part 6 that is configured and arranged to support an additional mass element M. In the illustrated embodiment, the carrying part 6 has a U-shaped cross section as viewed from the lateral vehicle direction with a lower part spaced downwardly from the undersurface of the roof panel P to form a mass element receiving cavity that extends in the lateral vehicle direction. Thus, the additional mass element M is disposed on the upper surface of the mass adding part 3 beneath the undersurface of the roof panel P. As a result, the additional mass element M that is added to the roof panel P can be adjusted, so that the margin by which the resonance frequency of the roof panel P is reduced can be adjusted to a desired value. In other words, by selecting one of prescribed additional mass element M having a predetermined mass value, the resonance frequency of the roof panel P can be adjusted to the desired value.

Additionally, at least one of the mass adding part 3 and the connecting part 4 preferably includes an accessory mounting arrangement 11 that is configured and arranged to support a passenger compartment lamp, a map lamp or other vehicle passenger compartment accessory component L.

The connecting part 4 is coupled to the base part 2 and disposed in the front to aft vehicle direction relative to the base part 2. In other words, the connecting part 4 extends in a front to aft direction of the vehicle to interconnect the base part 2 and the mass adding part 3. The connecting part 4 includes at least one bent part 5 that extend in a lateral vehicle direction in an area below the vehicle roof bow attachment point of the base part 2. In other words, the bent part 5 of the connecting part 4 has a U-shaped cross section in the front to aft vehicle direction with a lower part spaced downwardly from the undersurface of the roof panel P to form a cavity that extends in the lateral vehicle direction.

Since the base part 2 is joined to one of the roof bows R, and the base part 2 and the mass adding part 3 are connected by the connecting part 4 that has at least one bent part 5, the separation and dropping of the mass adding part 3 from the roof panel P can be prevented.

In addition, since the at least one bent part 5 is formed in the connecting part 4, the bending rigidity of the connecting part 4 with respect to forces oriented in the vertical direction of the vehicle (in the cross section of the connecting part 4 that includes the front to aft direction of the vehicle and the vertical direction of the vehicle) can be intentionally lowered. As a result, in cases in which the mass adding part 3 is joined to the roof panel P by the adhesive agent B, the mass of the mass adding part 3 can be efficiently added to the roof panel P with almost no support of the mass adding part 3 by the connecting part 4. Also an unnecessary increase in the weight of the mass adding part, and therefore an unnecessary increase in the weight of the dampening bracket for a roof panel P as a whole, can be suppressed. At the same time, in an event that the mass adding part 3 separates from the roof panel P, the connecting part 4 supports the mass adding part 3 to prevent the mass adding part 3 from falling from the roof panel P. This effect is increased as the number of bent parts is increased.

Furthermore, since the base part 3 of the dampening bracket is joined to one of the roof bows R, the dampening bracket can be joined to the roof panel P together with the roof bow R after the dampening bracket has been first joined to the roof bow R. Thus, the difficult operation of joining a dampening steel plate to the undersurface side of a roof panel via a thermoplastic material or adhesive agent can be dispensed with.

In this case, by joining the mass adding part 3 to the central portion of the roof panel P, it is possible to add mass at the center of the antinode portion of the membrane vibration of the roof panel P, so that the resonance frequency of the roof panel P can be more effectively reduced.

As mentioned above, the base part 2 is preferably joined to the roof bow R by spot welding, whereby two arbitrary positions on the base part 2 of the dampening bracket 1 for the roof panel P can be discontinuously joined to the roof bow R by welding. Thus, the welding can be performed in a more efficient manner. Furthermore, in the joining of the base part 2 to the roof bow R, it would also be possible to use methods other than welding, e.g., other methods include riveting, brazing, adhesive bonding or the like.

Furthermore, the reason that the mass adding part 3 is joined to the roof panel P by an adhesive agent B is to prevent distracting from the aesthetic appearance of the roof panel. Here, a roof reinforcement F is joined to the undersurface of the roof bow R by an adhesive agent B.

In addition, the roof panel dampening bracket 1 can be used as a bracket such that at least one of the mass adding part 3 and the connecting part 4 includes an accessory mounting arrangement 11 that is configured and arranged to support a passenger compartment lamp, a map lamp or other vehicle passenger compartment accessory component L. Accordingly, the parts that form the roof of the passenger compartment of the vehicle can be endowed with the function of the aforementioned dampening bracket for a roof panel, so that there is no need to add new parts. Furthermore, the resonance frequency of the roof panel can be reduced to a frequency that is lower than the cavity resonance frequency, so that the noise emitted by the roof panel can be suppressed, thus reducing the noise that is generated inside the passenger compartment.

In summary, the base part 2 of the dampening bracket 1 is joined by spot welding to the roof bow R (extending in the lateral direction of the vehicle) in the two locations indicated by double circles, and the mass adding part 3 is joined by the adhesive agent B to the roof panel P in the four locations indicated by single circles (i.e., two locations each in both end parts in the front to aft direction of the vehicle, for a total of four locations). The base part 2 and the mass adding part 3 are connected by the connecting part 4, and the bent part 5 that extends in the lateral direction of the vehicle are formed in the connecting part 4. Here, a single bent part 5 was formed; however, the bending rigidity of the connecting part 4 in the vertical direction can be further lowered, so that the mass of the added mass part 3 can be added to the roof panel more efficiently, by installing a plurality of bent parts. As shown in FIG. 1, the recessed carrying part 6 is provided for supporting the additional mass element M formed in the upper surface of the mass adding part 3.

Furthermore, the dampening bracket 1 of the present invention can be constructed by appropriately selecting a material from a group consisting of thin steel plates, aluminum, stainless steel plates, thermoplastic resins, thermosetting resins, composite materials and the like in accordance with the material of the roof bow.

Figure 4:
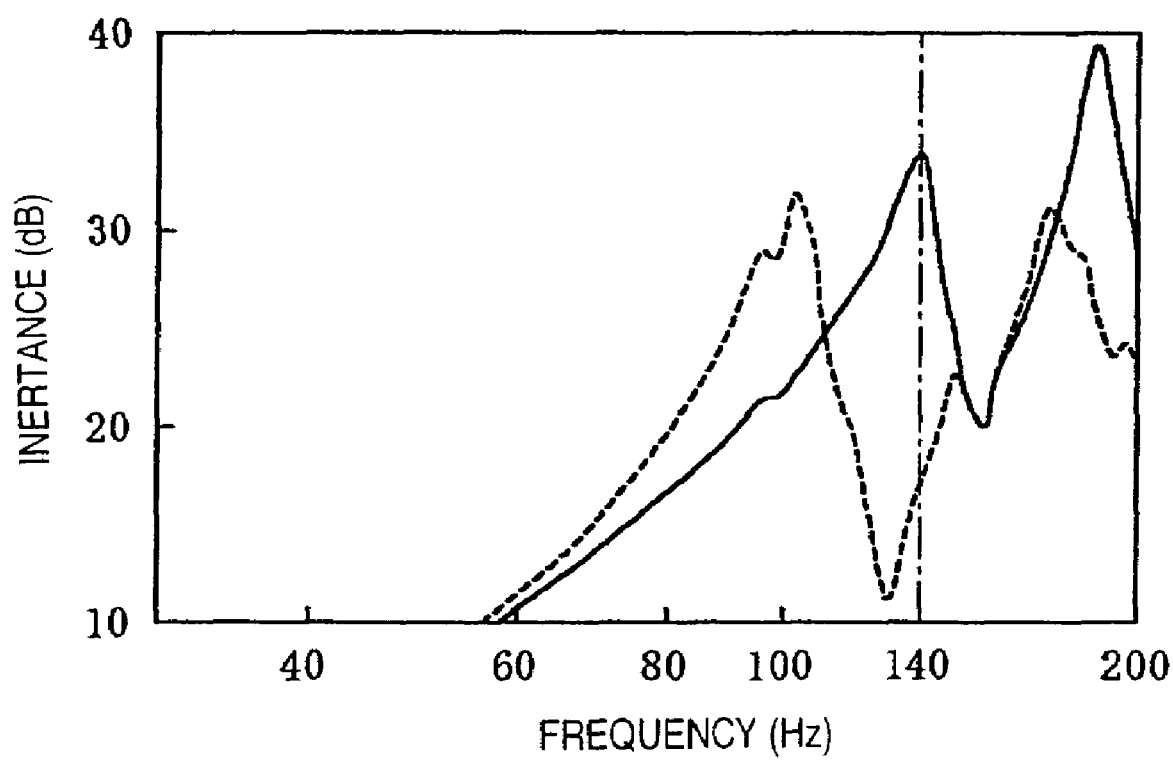
FIG. 4 is a graph showing the effect of the vehicle roof dampening bracket in accordance with the present invention.

The dampening bracket for a roof panel of the present invention was tested as described below using test vehicles in order to evaluate the effect of this bracket in reducing noise inside the passenger compartment by lowering the resonance frequency of the roof panel. Vibrations at respective specified frequencies were applied to the roof panels of the aforementioned test vehicles in which the dampening bracket for a roof panel of the present invention was attached, and to the roof panels of the aforementioned test vehicles to which this dampening bracket for a roof panel was not attached, the membrane vibration acceleration in specified positions of the respective roof panels was measured, and the values obtained by dividing these measurements by the respective vibration forces (inertance: (mm/s$^2$)/N) were determined. The results obtained are shown in FIG. 4. Furthermore, in FIG. 4, the vertical axis is shown as a log display (unit of measurement: dB) in order to make the graph easier to read.

The solid line in FIG. 4 shows the inertance of a roof panel on which no dampening bracket for a roof panel was mounted, while the broken line shows the inertance of a roof panel on which the aforementioned dampening bracket for a roof panel was mounted. The one-dot chain line indicates the secondary harmonic frequency around the cavity resonance, which is a particular problem among the cavity resonance frequencies peculiar to the test vehicle.

As indicated by the solid line in FIG. 4, in the roof panel in which no dampening bracket for a roof panel is attached, the primary membrane resonance frequency of the roof panel coincides with the secondary harmonic frequency in the vicinity of the cavity resonance; however, it is seen that as a result of the attachment of the dampening bracket for a roof panel of the present invention, the primary membrane resonance frequency of the roof panel is lowered (140→110 Hz), so that this frequency can be reduced to a value that is smaller than the secondary harmonic frequency in the vicinity of the cavity resonance (140 Hz). Here, the term "membrane vibration" refers to vibration in the direction of thickness of the roof panel.

Figure 5:
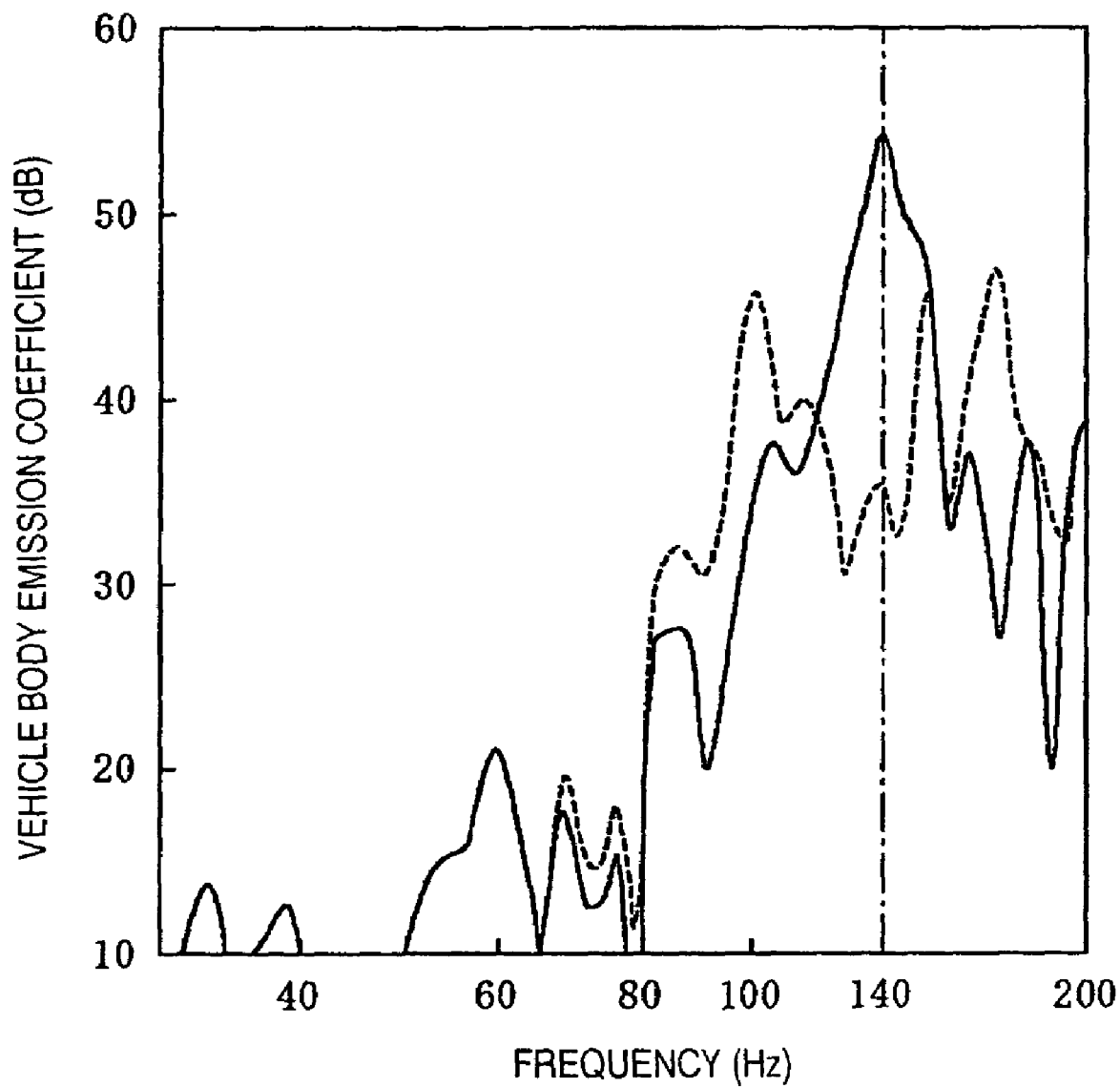
FIG. 5 is a graph showing the effect of the vehicle roof dampening bracket in accordance with the present invention.

Furthermore, the sound pressure per unit of input at the ear position (vehicle body emission coefficient: Pa/N) was determined in the case of a roof panel to which the dampening bracket for a roof panel of the present invention was attached, and in the case of a roof panel to which this dampening bracket for a roof panel was not attached, when the unit of input in the vertical direction was applied to the right engine mount of the test vehicle. The results are shown in FIG. 5. Furthermore, in FIG. 5, the vertical axis is shown as a log display (unit of measurement: dB) in order to make the graph easier to read.

The solid line in FIG. 5 indicates the vehicle body emission coefficient in a case in which no dampening bracket for a roof panel is attached, while the broken line indicates the vehicle body emission coefficient in a case in which the dampening bracket for a roof panel is attached. Furthermore, the one-dot chain line indicates the secondary harmonic frequency around the cavity resonance, which is peculiar to the test vehicle. Moreover, here as well, only the portion of the broken line that differs from the solid line is indicated. At 70 Hz and below, this broken line coincides with the solid line.

As shown in FIG. 5, the vehicle body emission coefficient in a case in which no dampening bracket for a roof panel is attached shows the occurrence of a large peak in the vicinity of 140 Hz (as indicated by the solid line), since the primary membrane resonance frequency of the roof panel and the secondary harmonic frequency of the cavity resonance coincide with each other, as was described above. However, it is seen that by attaching the dampening bracket for a roof panel of the present invention so that the membrane primary frequency of the roof panel is lowered (140→110 Hz), thus setting this frequency at a frequency that is smaller than the secondary harmonic frequency in the vicinity of the cavity resonance (140 Hz), it is possible to lower the peak of the vehicle body emission coefficient and to reduce the amount of noise.

Figure 6:
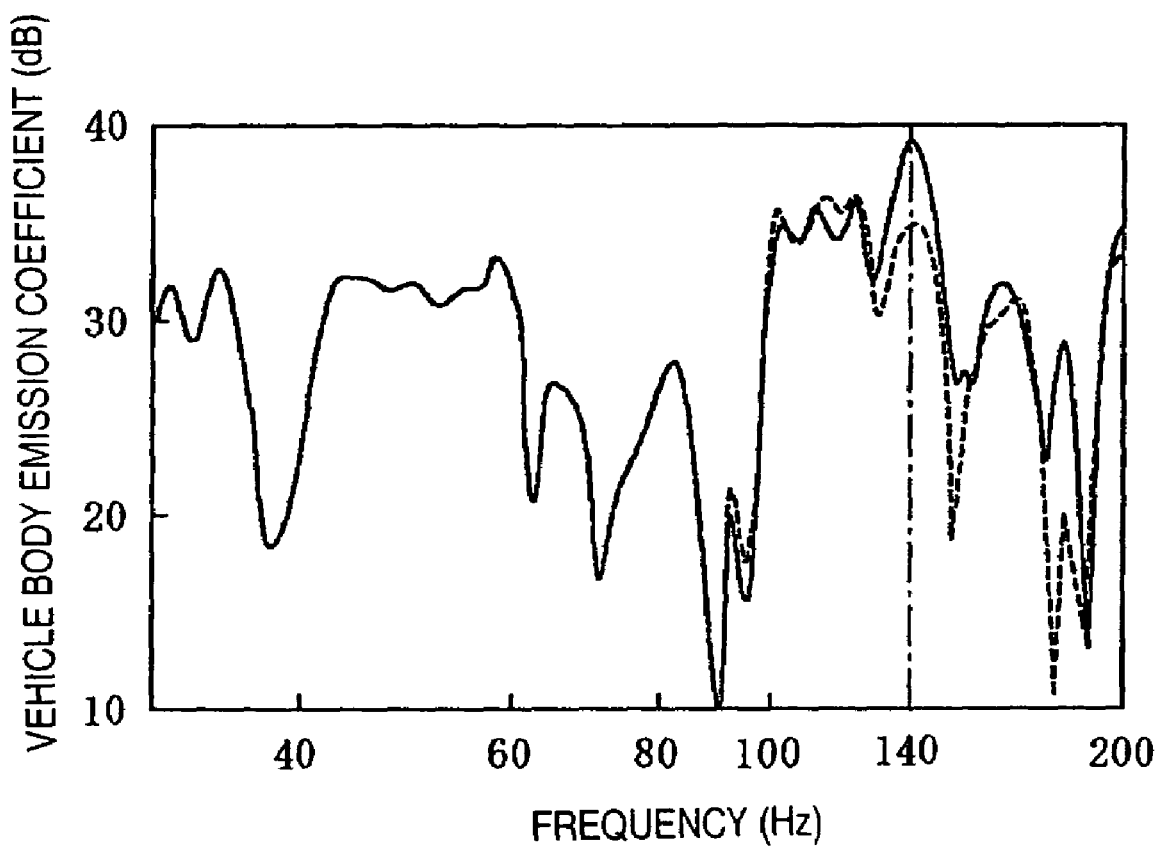
FIG. 6 is a graph showing the effect of the vehicle roof dampening bracket in accordance with the present invention.

Furthermore, the sound pressure per unit of input at the ear position (vehicle body emission coefficient: Pa/N) was determined in the case of a roof panel to which the dampening bracket for a roof panel of the present invention was attached and in the case of a roof panel to which this dampening bracket for a roof panel was not attached, when the unit of input in the vertical direction was applied to the right engine mount of the test vehicle. The results are shown in FIG. 6. Furthermore, in FIG. 6, the vertical axis is shown as a log display (unit of measurement: dB) in order to make the graph easier to read.

The solid line in FIG. 6 indicates the vehicle body emission coefficient in a case in which no dampening bracket for a roof panel is attached, while the broken line indicates the vehicle body emission coefficient in a case in which the dampening bracket for a roof panel is attached. Furthermore, the one-dot chain line indicates the secondary harmonic frequency around the cavity resonance, which is peculiar to the test vehicle. Moreover, here as well, only the portion of the broken line that differs from the solid line is indicated. At 90 Hz and below, this broken line coincides with the solid line.

As shown in FIG. 6, it is seen that by attaching the dampening bracket for a roof panel of the present invention so that the membrane primary frequency of the roof panel is lowered (140→110 Hz), thus setting this frequency at a frequency that is smaller than the secondary harmonic frequency in the vicinity of the cavity resonance (140 Hz) and reducing the amount of noise emitted by the roof panel is reduced, it is possible in particular to reduce muffled noise at 100 to 200 Hz.

If the primary membrane resonance frequency of the roof panel is superimposed on the cavity resonance frequency or is greater than this frequency, the roof panel emits a sound so that an unpleasant noise is generated inside the passenger compartment.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. As used herein, the term "adhesive agent" refers to a so-called mastic adhesive agent, which must not contribute to strain in the roof panel following hardening as one of its characteristics. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle roof panel dampening bracket comprising:
   a base part forming a vehicle roof bow attachment point;
   a connecting part coupled to the base part and disposed in a front to aft vehicle direction relative to the base part with the connecting part including at least one bent part that extends in a lateral vehicle direction in an area below the vehicle roof bow attachment point of the base part; and
   a mass adding part coupled to the connecting part and disposed in the front to aft vehicle direction relative to the connecting part with the mass adding part having a prescribed mass to function as a mass dampener that controls a resonance frequency of the roof panel by adding mass to the roof panel, the mass adding part having a forward roof panel attachment point and a rearward roof panel attachment point that are spaced apart in the front to aft vehicle direction with the forward and rearward roof panel attachment points to be bonded to a roof panel undersurface by an adhesive agent.

2. The vehicle roof panel dampening bracket according to claim 1, wherein
   the mass adding part includes a carrying part to support an additional mass element on an upper surface of the mass adding part.

3. The vehicle roof panel dampening bracket according to claim 1, wherein
   the vehicle roof bow attachment point of the base part is joined to a roof bow by spot welding.

4. The vehicle roof panel dampening bracket according to claim 3, wherein
   at least two spot welds join the vehicle roof bow attachment point of the base part to the roof bow with the spot welds being spaced apart in the lateral vehicle direction.

5. The vehicle roof panel dampening bracket according to claim 1, wherein
   at least one of the mass adding part and the connecting part includes an accessory mounting arrangement that is configured and arranged to support a vehicle accessory component.

6. The vehicle roof panel dampening bracket according to claim 1, wherein
   at least one of the mass adding part and the connecting part has a U-shaped cross section as viewed from the lateral vehicle direction.

7. The vehicle roof panel dampening bracket according to claim 1, wherein
   the base part, the mass adding part and the connecting part are formed as a one-piece member from a sheet material.

8. The vehicle roof panel dampening bracket according to claim 2, wherein
   the vehicle roof bow attachment point of the base part is joined to a roof bow by spot welding.

9. The vehicle roof panel dampening bracket according to claim 8, wherein
   at least two spot welds join the vehicle roof bow attachment point of the base part to the roof bow with the spot welds being spaced apart in the lateral vehicle direction.

10. The vehicle roof panel dampening bracket according to claim 2, wherein
    at least one of the mass adding part and the connecting part includes an accessory mounting arrangement that is configured and arranged to support a vehicle accessory component.

11. The vehicle roof panel dampening bracket according to claim 2, wherein
    at least one of the mass adding part and the connecting part has a U-shaped cross section as viewed from the lateral vehicle direction.

12. The vehicle roof panel dampening bracket according to claim 2, wherein the base part, the mass adding part and the connecting part are formed as a one-piece member from a sheet material.

13. A vehicle roof structure comprising:

a vehicle roof panel;

a vehicle roof bow disposed beneath an undersurface of the roof panel in a lateral vehicle direction; and a vehicle roof panel dampening bracket coupled to the vehicle roof panel and the vehicle roof bow; the vehicle roof panel dampening bracket including a base part joined to the vehicle roof bow;

a connecting part coupled to the base part and disposed in a front to aft vehicle direction relative to the base part with the connecting part including at least one bent part that extends in the lateral vehicle direction, and a mass adding part coupled to the connecting part and disposed in the front to aft vehicle direction relative to the connecting part with the mass adding part having a prescribed mass to function as a mass dampener that controls a resonance frequency of the roof panel by adding mass to the roof panel, the mass adding part be bonded to the undersurface of the roof panel by an adhesive agent in at least two points spaced apart in the front to aft vehicle direction.

14. The vehicle roof structure according to claim 13, wherein the mass adding part includes a carrying part to support an additional mass element on an upper surface of the mass adding part.

15. The vehicle roof structure according to claim 13, wherein the vehicle roof bow attachment point of the base part is joined to a roof bow by spot welding.

16. The vehicle roof structure according to claim 15, wherein at least two spot welds join the vehicle roof bow attachment point of the base part to the roof bow with the spot welds being spaced apart in the lateral vehicle direction.

17. The vehicle roof structure according to claim 13, wherein at least one of the mass adding part and the connecting part includes an accessory mounting arrangement to support a vehicle accessory component.

18. The vehicle roof structure according to claim 13, wherein the base part, the mass adding part and the connecting part are formed as a one-piece member from a sheet material.

19. The vehicle roof structure according to claim 13, wherein at least one of the mass adding part and the connecting part has a U-shaped cross section as viewed from the lateral vehicle direction.

20. A vehicle roof panel dampening bracket comprising:

base means for forming a vehicle roof bow attachment point;

connecting means for forming a support extending from the base means in a front to aft vehicle direction relative to the base means with at least one bent part that extends in a lateral vehicle direction in an area below the vehicle roof bow attachment point; and mass adding means for functioning as a mass dampener that controls a resonance frequency of a roof panel by adding mass to the roof panel, the mass adding means being disposed in the front to aft vehicle direction relative to the connecting means and the mass adding means having a forward roof panel attachment point and a rearward roof panel attachment point that are spaced apart in the front to aft vehicle direction with the forward and rearward roof panel attachment points to be bonded to a roof panel undersurface by an adhesive agent.

* * * * *